United States Patent
Halverson et al.

(10) Patent No.: US 8,996,925 B2
(45) Date of Patent: *Mar. 31, 2015

(54) MANAGING ERROR LOGS IN A DISTRIBUTED NETWORK FABRIC

(71) Applicant: International Business Machines Corporation, Armonk, NY (US)

(72) Inventors: Paul S. Halverson, Byron, MN (US); Grady W. Jensen, Rochester, MN (US); Paul E. Movall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/791,289

(22) Filed: Mar. 8, 2013

(65) Prior Publication Data
US 2014/0245085 A1   Aug. 28, 2014

Related U.S. Application Data

(63) Continuation of application No. 13/773,987, filed on Feb. 22, 2013.

(51) Int. Cl.
G06F 11/00    (2006.01)
G06F 11/14    (2006.01)
G06F 11/07    (2006.01)

(52) U.S. Cl.
CPC ........ *G06F 11/1412* (2013.01); *G06F 11/0766* (2013.01)

USPC .............................................. 714/48; 714/20

(58) Field of Classification Search
CPC ......................... G06F 11/0766; G06F 11/0784
USPC ...................................... 714/48, 57; 719/318
See application file for complete search history.

(56) References Cited

U.S. PATENT DOCUMENTS

| | | | |
|---|---|---|---|
| 5,642,478 A | 6/1997 | Chen et al. | |
| 5,808,911 A * | 9/1998 | Tucker et al. | 719/316 |
| 6,470,388 B1 | 10/2002 | Niemi et al. | |
| 2003/0005173 A1 * | 1/2003 | Shah et al. | 709/318 |
| 2004/0028059 A1 * | 2/2004 | Josyula et al. | 370/396 |
| 2007/0027952 A1 * | 2/2007 | Boyd et al. | 709/204 |
| 2008/0244331 A1 * | 10/2008 | Grimes et al. | 714/48 |
| 2013/0054680 A1 * | 2/2013 | Nakano et al. | 709/203 |

* cited by examiner

*Primary Examiner* — Yolanda L Wilson
(74) *Attorney, Agent, or Firm* — Patterson & Sheridan, LLP

(57) ABSTRACT

An approach is described for managing error logs and corresponding error descriptors among a plurality of controller nodes of a distributed network fabric. According to such approach, an error log may include output from a runtime code trace. The runtime code trace may include storing trace statements from a currently running process in one or more of a plurality of trace buffers. The trace buffers may be memory-mapped circular buffers. Additionally, an error descriptor may be created from the error log. A globally unique identifier may be assigned to the error descriptor, and both the error descriptor and the globally unique identifier may be broadcast to each other controller node among the plurality of controller nodes.

7 Claims, 6 Drawing Sheets

MANAGING ERROR LOGS IN A DISTRIBUTED NETWORK FABRIC

CROSS-REFERENCE TO RELATED APPLICATIONS

This application is a continuation of co-pending U.S. patent application Ser. No. 13/773,987, filed Feb. 22, 2013. The aforementioned related patent application is herein incorporated by reference in its entirety.

BACKGROUND

The various embodiments described herein generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots and also may permit communication between servers in the same or different chassis. In addition, multiple switches may also be combined to create a distributed network fabric. The distributed network fabric may include multiple controller nodes for coordinating activities among the multiple servers.

BRIEF SUMMARY

The various embodiments described herein may identify and address errors in a distributed network fabric. One embodiment includes a method of managing errors in a distributed network fabric comprised of a plurality of controller nodes. The method may include receiving, at a first controller node, an error descriptor from a second controller node among the plurality of controller nodes. The error descriptor may be created at the second controller node based on an error log. The method further may include committing the error descriptor to a database. The method further may include assigning an identifier to the error descriptor, the identifier being globally unique in the distributed network fabric. The method further may include broadcasting the error descriptor and the identifier to each other controller node among the plurality of controller nodes.

In one embodiment, the first controller node may be a master controller node that coordinates activities among the plurality of controller nodes. In a further embodiment, the error log may include output obtained by performing a runtime code trace. Performing the runtime code trace may include storing one or more trace statements from a currently running process in one or more of a plurality of trace buffers, wherein each of the plurality of trace buffers corresponds to a respective firmware component of the second controller node. In another embodiment, the plurality of trace buffers may be memory-mapped circular buffers.

In a further embodiment, the error log may include metrics indicating at least one of a listing of firmware components affected by or contributing to the error, an identifier of a process in which the error occurred, a code location at which the error occurred, a host name of the controller node at which the error occurred, a network address of the controller node at which the error occurred, a count of previous occurrences of the error, a timestamp for when the error occurred, and one or more error return codes. Additionally, the error descriptor may include a subset of the metrics included in the error log.

Additional embodiments include a computer-readable storage medium storing an application, which, when executed on a processor, performs the above recited method.

A further embodiment includes a distributed network fabric. The distributed network fabric may include a plurality of controller nodes, including a first controller node including at least one first processor and a second controller node including at least one second processor. The second controller node may be configured to create an error descriptor based on an error log. The first controller node may be configured to receive the error descriptor from the second controller node, commit the error descriptor to a database, assign a globally unique identifier to the error descriptor, and broadcast the error descriptor and the globally unique identifier to each other controller node among the plurality of controller nodes.

BRIEF DESCRIPTION OF SEVERAL VIEWS OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
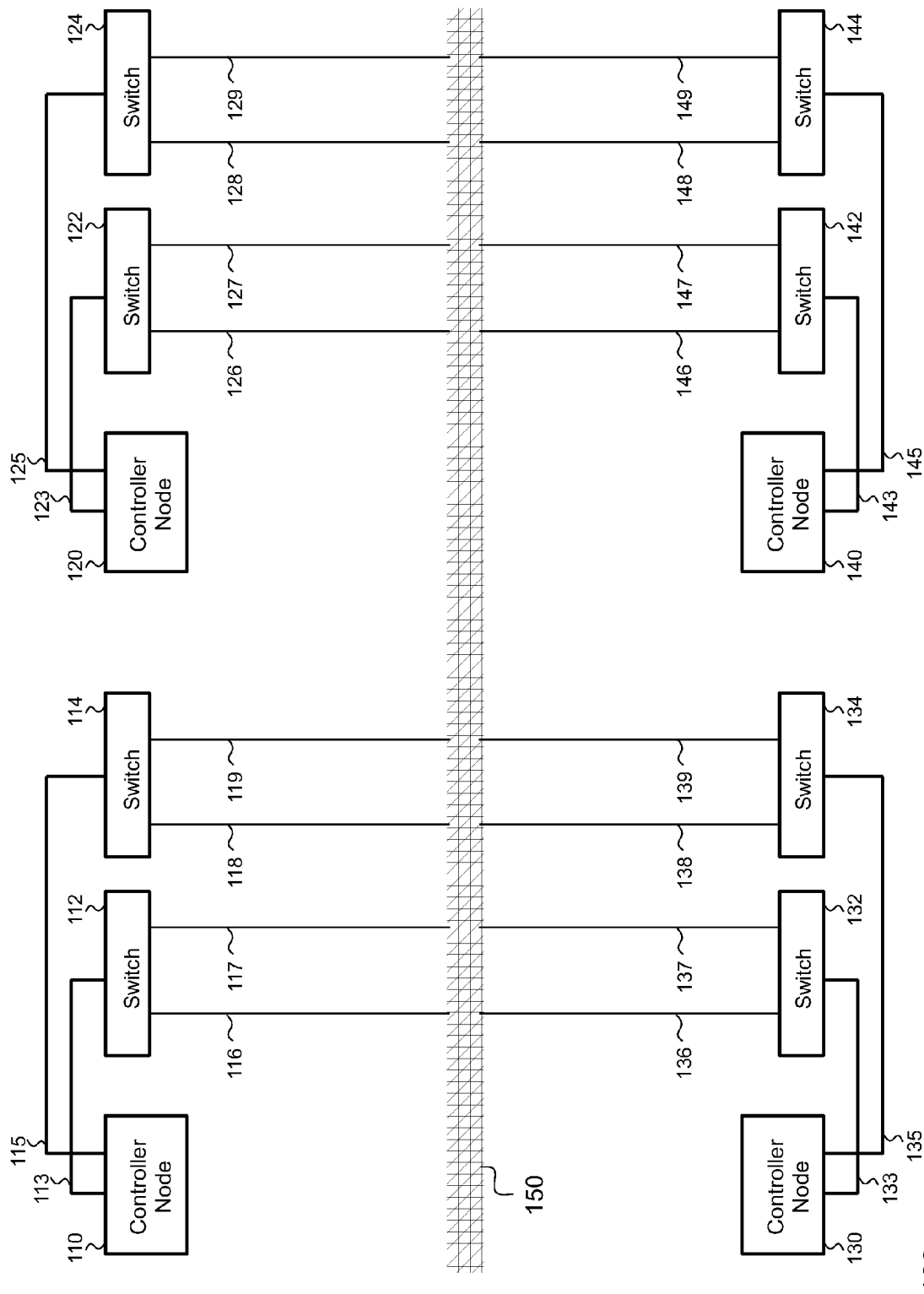
FIG. 1 illustrates controller nodes and switches of a distributed network fabric, according to one embodiment.

The various embodiments described herein are directed to techniques for managing error logs and corresponding error descriptors among a plurality of nodes in a distributed network fabric.

Techniques must be devised to address errors, or unexpected events, in a system. Trace functionality may help determine the origin of errors. On a server including multiple nodes distributed across a network fabric, conventional error handling typically includes activating trace functionality in response to an error. The trace functionality may be used to generate an appropriate error log. However, activating trace functionality in response to an error generally requires accessing and inspecting a relatively large system trace log to determine the nature of the error. Thus, conventional trace functionality may increase network latency and reduce network efficiency.

Furthermore, conventional error handling often involves error log synchronization among all network nodes in a fabric. Such synchronization may include creating an error log at a network node and subsequently broadcasting the error log to all of the other network nodes. However, given the relatively large size of an error log, broadcasting an error log to each other network node may decrease network bandwidth and efficiency, as significant network resources must be expended to propagate the contents of an error log across the network. Additionally, given that network nodes may have limited local storage, broadcasting the entire error log (or significant portions thereof) may hinder the ability of network nodes to store necessary code and background processes.

Additionally, conventional error handling generally focuses upon errors occurring locally at a single node rather than errors that may affect multiple nodes of a distributed network fabric. Thus, error log management methods are needed to identify errors impacting multiple nodes of a fabric. Such methods should address identified errors while saving network bandwidth and storage.

The various embodiments described herein provide techniques for managing error logs and corresponding error descriptors in a distributed network fabric without the shortcomings of conventional error handling. More specifically, the embodiments provide methods of performing a runtime code trace on a network node, creating an error log including output from the runtime code trace, and creating an error descriptor based on the error log. According to the embodiments, a distributed network fabric may include a plurality of controller nodes, each with one or more associated switches. Each of the plurality of controller nodes may communicate by relaying data via its associated switches to switches associated with one or more other controller nodes.

According to an embodiment, code trace functionality on the plurality of controller nodes of the distributed network fabric may be continuously enabled, including at runtime. Thus, whenever an error occurs, trace information may be quickly accessed without having to access and inspect a relatively large system trace log. The runtime code trace functionality described herein may include storing code trace in trace buffers. In one embodiment, these trace buffers may be memory-mapped circular buffers. The runtime code trace functionality may provide a code trace via specific buffers corresponding to respective firmware components of a controller node of the distributed network fabric.

The output from a runtime code trace may be used to identify and address errors at a controller node. Upon occurrence of an error, the controller node may create an error log corresponding to the error and may incorporate the runtime code trace output into the error log. Since past results are indicative of which traces would be helpful to identify the circumstances of a specific error, one or more trace buffers may be designated to store runtime code trace information for the error. Furthermore, trace buffer information may be designated in advance to be included in the error log. In addition to buffered information from a runtime code trace, the error log may include metrics describing the nature of the error. For instance, the metrics may identify the code location at which the error occurred, actions that may be taken to address the error, and information regarding the controller node at which the error occurred. Moreover, the metrics may include one or more error return codes identifying the error.

Furthermore, upon creating the error log, the controller node may generate an error descriptor based upon the error log. The error descriptor may include a subset of the metrics included in the error log. Upon generating the error descriptor, the controller node may transmit the error descriptor to a master controller node responsible for coordinating activities in the distributed network fabric. The master controller node may assign the error descriptor a globally unique identifier, which may be associated with both the error descriptor and the corresponding error log. Subsequently, the master controller node may broadcast the globally unique identifier along with the error descriptor to each of the controller nodes in the fabric. As a result of the broadcast, each controller node obtains an error descriptor. Broadcasting the globally unique identifier and the error descriptor to each of the controller nodes in the fabric may provide redundancy to ensure that error information is preserved in the event that one or more controller nodes fail. Since an error descriptor may be substantially smaller in size than an error log, substantial network bandwidth and storage resources may be preserved by broadcasting an error descriptor rather than an error log across the fabric.

The various embodiments described herein may have various advantages over conventional error handling techniques. For instance, implementing runtime trace via memory-mapped circular buffers may increase network efficiency and reduce network latency with respect to error identification. Moreover, creating an error descriptor from a controller node error log and broadcasting the error descriptor to each controller node in a network fabric may facilitate error communication among controller nodes while saving network bandwidth and storage. Furthermore, error descriptors may facilitate aggregation of error data within a network fabric, which may be beneficial in identifying and addressing related errors.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium or, alternatively, a computer readable signal medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the various embodiments described herein, workloads of one or more of the controller nodes of a distributed network fabric may be deployed to a computing cloud (whether the cloud itself is provided by the enterprise or a third party). Moreover, cloud-based database systems, virtual machines, and a variety of other server applications may be used to manage workloads of one or more of such controller nodes.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments describe techniques for managing error logs across a distributed network fabric. However, it should be understood that the techniques described herein may be adapted to a variety of purposes in addition to the uses for adjusting administrative access. Accordingly, references to the specific embodiments are included to be illustrative and not limiting.

FIG. 1 illustrates a distributed network fabric 100. As shown, the distributed network fabric 100 may include a plurality of controller nodes 110, 120, 130, and 140. According to an embodiment, these controller nodes may be IBM® I/O Management Controllers (IOMCs). At least one of these controller nodes may handle a group of server blades in a server system. Moreover, any of these controller nodes may serve as a master controller node in a given context in order to coordinate activities across distributed network fabric 100. Although four controller nodes are depicted in FIG. 1, distributed network fabric 100 may include any number of controller nodes.

Each controller node of the distributed network fabric 100 may be associated with one or more switches. According to an embodiment, the switches may be distributed virtual bridges. As shown, controller node 110 may be associated with switches 112 and 114, controller node 120 may be associated with switches 122 and 124, controller node 130 may be associated with switches 132 and 134, and controller node 140 may be associated with switches 142 and 144. Controller node 110 may be connected to associated switches 112 and 114 via buses 113 and 115, respectively. Controller node 120 may be connected to associated switches 122 and 124 via buses 123 and 125, respectively. Controller node 130 may be connected to associated switches 132 and 134 via buses 133 and 135, respectively. Controller node 140 may be connected to associated switches 142 and 144 via buses 143 and 145, respectively. Although each of the controller nodes 110, 120, 130, and 140 are associated with two switches in FIG. 1, controller nodes in distributed network fabric 100 may be associated with any number of switches.

Distributed network fabric 100 further may include a fabric mesh 150. According to an embodiment, the fabric mesh 150 may be a local rack interconnect network. Although shown as a single interconnect, fabric mesh 150 is included to be representative of additional controller nodes and associated switches interconnected with the depicted controller nodes 110, 120, 130, and 140. Each switch associated with controller nodes 110, 120, 130, and 140 may be connected to fabric mesh 150 via one or more interconnects (e.g., buses). As shown, switches 112 and 114 associated with controller node 110 may be connected to fabric mesh 150 via buses 116-117 and buses 118-119, respectively. Switches 122 and 124 associated with controller node 120 may be connected to fabric mesh 150 via buses 126-127 and buses 128-129, respectively. Switches 132 and 134 associated with controller node 130 may be connected to fabric mesh 150 via buses 136-137 and buses 138-139, respectively. Switches 142 and 144 associated with controller node 140 may be connected to fabric mesh 150 via buses 146-147 and buses 148-149, respectively. Although each of the depicted switches is connected to fabric mesh 150 via two buses, switches in distributed network fabric 100 may be connected to fabric mesh 150 via varying quantities of buses.

Figure 2:
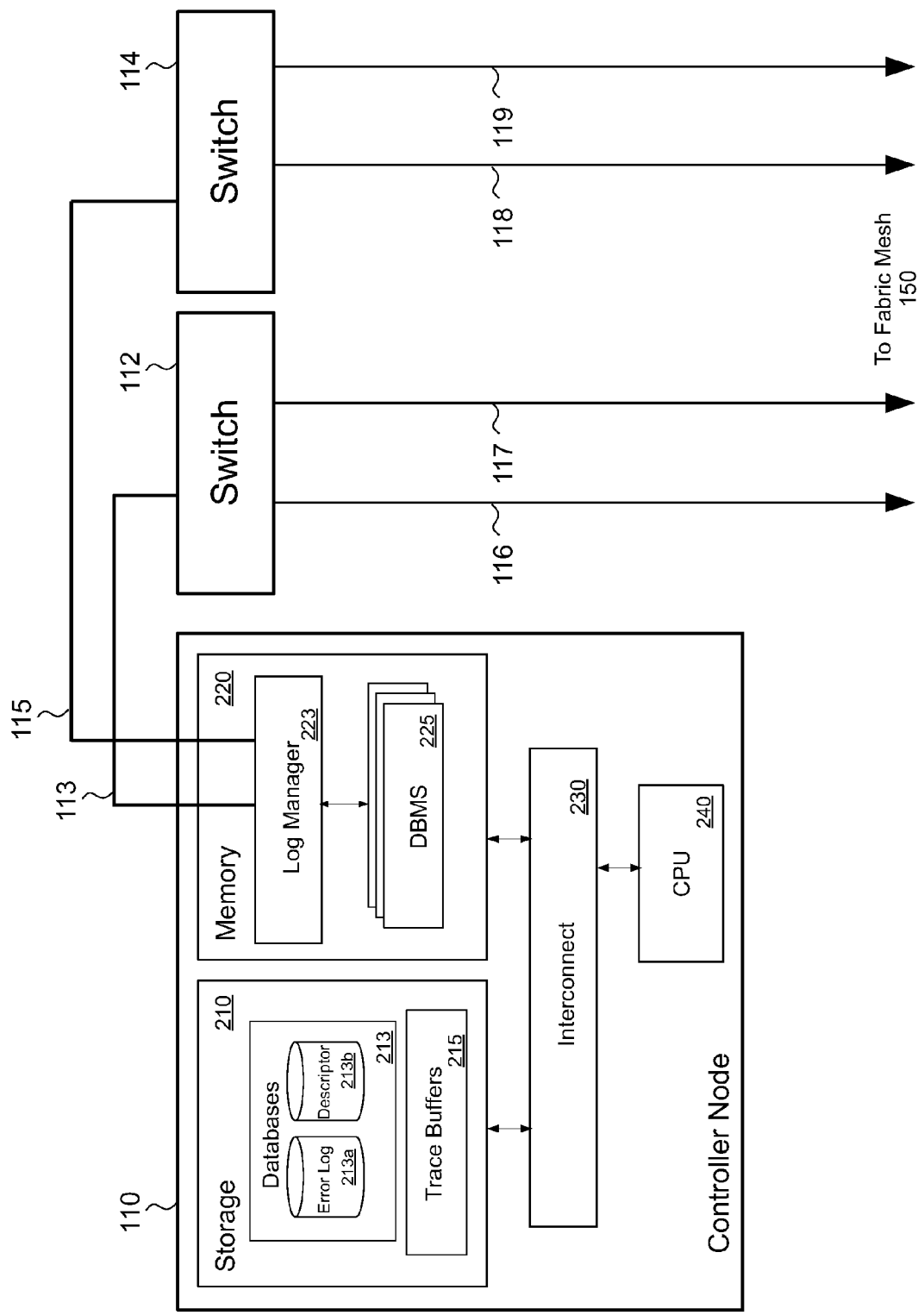
FIG. 2 illustrates a detailed view of a controller node and associated switches within a distributed network fabric, according to one embodiment.

FIG. 2 illustrates a detailed view of controller node 110 and associated switches 112 and 114 within distributed network fabric 100. As shown, controller node 110 may include, without limitation, storage 210, a memory 220, an interconnect 230, and a central processing unit (CPU) 240.

CPU 240 may retrieve and execute programming instructions stored in memory 220. Similarly, the CPU 240 may retrieve and store application data residing in memory 220. Interconnect 230 may facilitate transmission, such as of programming instructions and application data, among storage 210, memory 220, and CPU 240. CPU 240 is included to be representative of a single CPU, multiple CPUs, a single CPU having multiple processing cores, and the like. Moreover, CPU 240 may support multithreading. Storage 210 is included to be representative of a disk drive storage device.

Although shown as a single unit, storage 210 may be a combination of fixed and/or removable storage devices, such as fixed disc drives, floppy disc drives, tape drives, removable memory cards or optical storage, network attached storage (NAS), or a storage area network (SAN).

In one embodiment, storage 210 may include databases 213. Databases 213 may store one or more error logs that include information regarding one or more errors occurring on controller node 110 or another controller node in the distributed network fabric 100. Further, databases 213 may store one or more error descriptors associated with the error logs. As shown, databases 213 include a database 213a for error logs and another database 213b for error descriptors. However, according to another embodiment, a single database may be used for both error logs and error descriptors. According to a further embodiment, error logs and error descriptors may be distributed among a plurality of databases. Databases 213 may store additional information pertaining to controller node 110. According to an embodiment, database 213b may store globally unique identifiers associated with respective error descriptors.

In one embodiment, storage 210 further may include trace buffers 215 configured to store runtime code trace information obtained according to techniques described herein. According to an embodiment, trace buffers 215 may be memory-mapped circular buffers. More specifically, the trace buffers 215 may be first in, first out buffers that may provide memory-mapped access to a process. Memory-mapped circular buffers permit the oldest material to be replaced once full, thus increasing storage speed and preventing overwrite errors.

Memory 220 is included to be representative of a random access memory. As shown, memory 220 may include a log manager 223 and database management system (DBMS) 225. Log manager 223 may send database information to and receive database information from databases 213 via DBMS 225. Furthermore, log manager 223 may transmit information to and receive information from switches 112 and 114. Accordingly, log manager 223 may facilitate communication to and from other controller nodes in distributed network fabric 100. Specifically, log manager 223 may ensure that error descriptor information is synchronized among controller nodes of the distributed network fabric 100.

Figure 3:
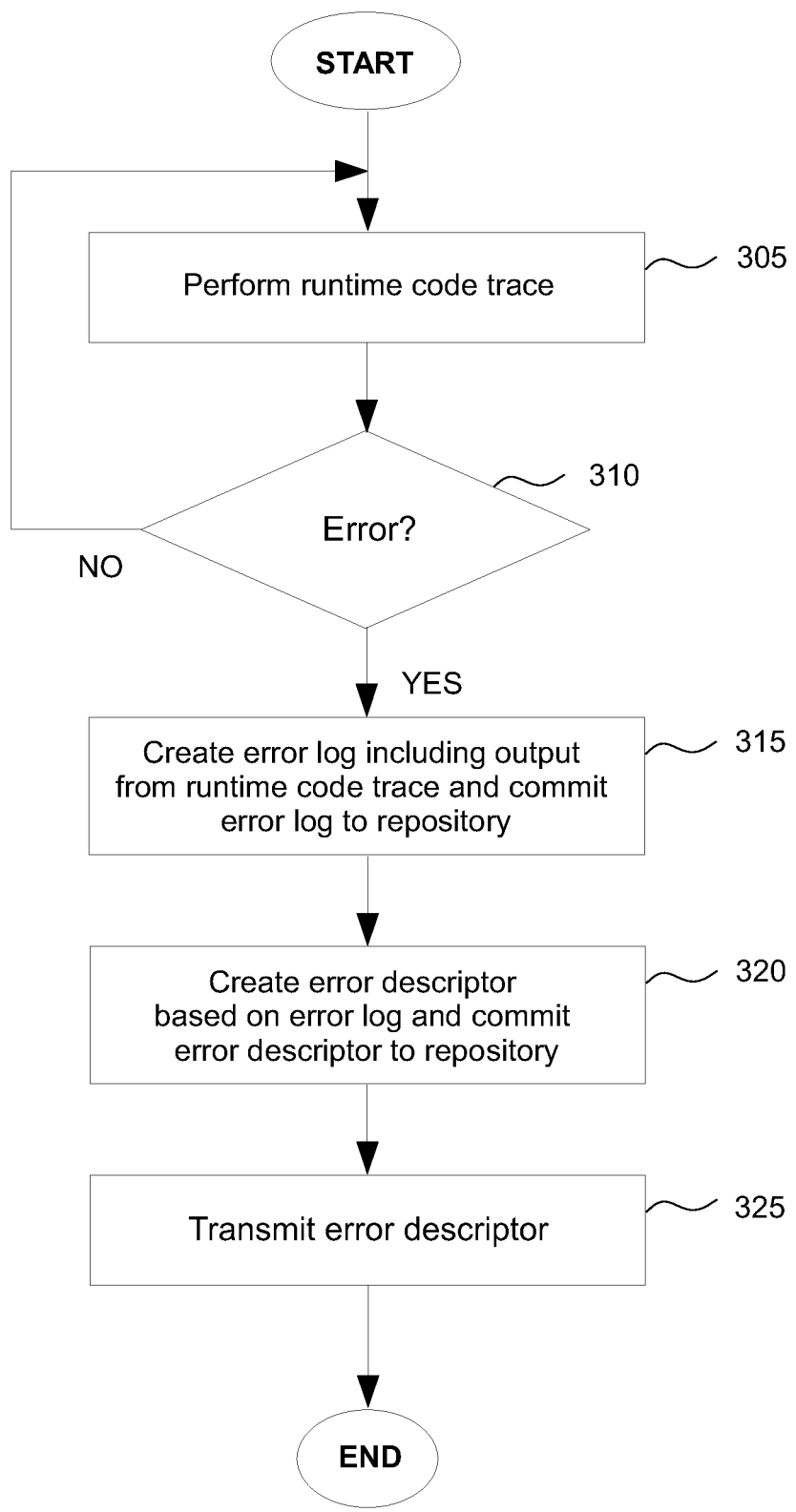
FIG. 3 illustrates a method of creating an error log and a corresponding error descriptor in a distributed network fabric, according to one embodiment.

FIG. 3 illustrates a method 300 of creating an error log and a corresponding error descriptor at a controller node of a distributed network fabric (e.g., controller node 110). The method 300 begins at step 305, where the controller node may perform a runtime code trace. According to an embodiment, the controller node may perform such runtime trace via code executed by a controller node processor (e.g., CPU 240). The trace may provide information regarding executed lines of code and variable values. According to an embodiment, code executing at the controller node may perform such trace with respect to firmware components. More specifically, each trace buffer among the trace buffers of the controller node (e.g., trace buffers 215) may correspond to a particular firmware component. When code is executed for a particular firmware component, trace statements in such code may be stored in the trace buffer corresponding to the particular firmware component. A more detailed description of performing a runtime code trace is provided herein in conjunction with FIG. 4.

At step 310, the controller node may determine whether an error has occurred during code execution. If at step 310 the controller node determines that an error has not occurred, then the method may return to step 305. Otherwise, responsive to the controller node determining that an error has occurred, then at step 315 the controller node may create an error log that may include output from a runtime code trace. Additionally, at step 315 the controller node may commit the error log to a database of the controller node. In one embodiment, the runtime code trace process may send information regarding such error via inter-process communication to a database controlling process, and the database controlling process may create the error log. Furthermore, the database controlling process may synchronize the error log if necessary. The error log may be stored in a database within the controller node (e.g., database 213*a*). A log manager of the controller node (e.g., log manager 223) may facilitate creation of the error log.

The error log may store runtime code trace output relevant to an error. The amount of trace buffer information to be included in an error log may be predetermined (e.g., according to an indication received from a programmer or system administrator). In order to limit the size of trace buffer information to be included in the error log, in some embodiments the error log may be configured to include only the last "N" lines of trace, where "N" is an integer. For example, if only the last 100 lines of trace are necessary to determine the nature of an error, the error log may be configured to include only the last 100 lines of trace.

In one embodiment, in addition to output from a runtime code trace, the error log may include metrics describing the nature of an error. Examples of the metrics include metrics that indicate a value indicating a severity level of the error, a listing of firmware components affected by or contributing to the error, a listing of specific actions that may be taken to address the error, an identifier of the process in which the error occurred, a code location at which the error occurred, a code function in which the error occurred, a host name of the controller node on which the error occurred, a network address (e.g., Media Access Control (MAC) address) of the controller node on which the error occurred, a count of previous occurrences of the error, a timestamp for when the error occurred, a timestamp for when the error was stored in the error log, and a version of the firmware run by the controller node.

In one embodiment, the error log may include one or more error return codes. In some embodiments, the error log may include a first return code that is firmware-unique and that pinpoints the controller node code location at which error occurred. In some embodiments, the error log may include a second error return code that describes the error in the context of the currently executing function. The second return code may describe the code pathway in the context of the error.

In one embodiment, the controller node may generate a summary error log by combining information from multiple error logs created at the controller node or at other controller nodes within the distributed network fabric. A summary error log may provide a comprehensive view of information regarding multiple errors (rather than a limited view of information regarding one or few errors). Accordingly, a summary error log may provide significant insight for determining the genesis of an error or a group of related errors. According to an embodiment, a generated summary error log may be stored in database 213*a*.

In one embodiment, databases of a controller node within the distributed network fabric may include information regarding the affinity of various firmware components of the controller node, referred to herein as affinity information. In one embodiment, a summary error log may incorporate affinity information. Affinity information may indicate the significance of various errors with respect to the firmware components of the controller node. Accordingly, such affinity information may facilitate finding an appropriate solution to an error and relating various errors to one another. According to an embodiment, affinity information may include first-failure data capture (FFDC) data.

At step 320, the controller node creates an error descriptor based on the error log, and may commit the error descriptor to a database of the controller node (e.g., database 213*b*). The error descriptor may include a subset of the metrics included in the error log. For example, an error descriptor may include aspects of an error log, such as a code location at which the error occurred, information regarding the controller node at which the error occurred, and one or more relevant error return codes. It should be appreciated that since an error descriptor may include a subset of error log information, the error descriptor may be significantly smaller than an error log, and thus may be transmitted and stored more easily (e.g., using less network bandwidth and storage space) among the controller nodes of the distributed network fabric.

At step 325, the controller node may transmit the error descriptor to another controller node (e.g., via the fabric mesh 150), which may in turn may manage the error descriptor and propagate the error descriptor to other controller nodes of the distributed network fabric. According to an embodiment, the controller node may send the error to a master controller node responsible for coordinating activities across the distributed network fabric. A more detailed description of managing an error descriptor is provided herein in the context of FIG. 5.

Figure 4:
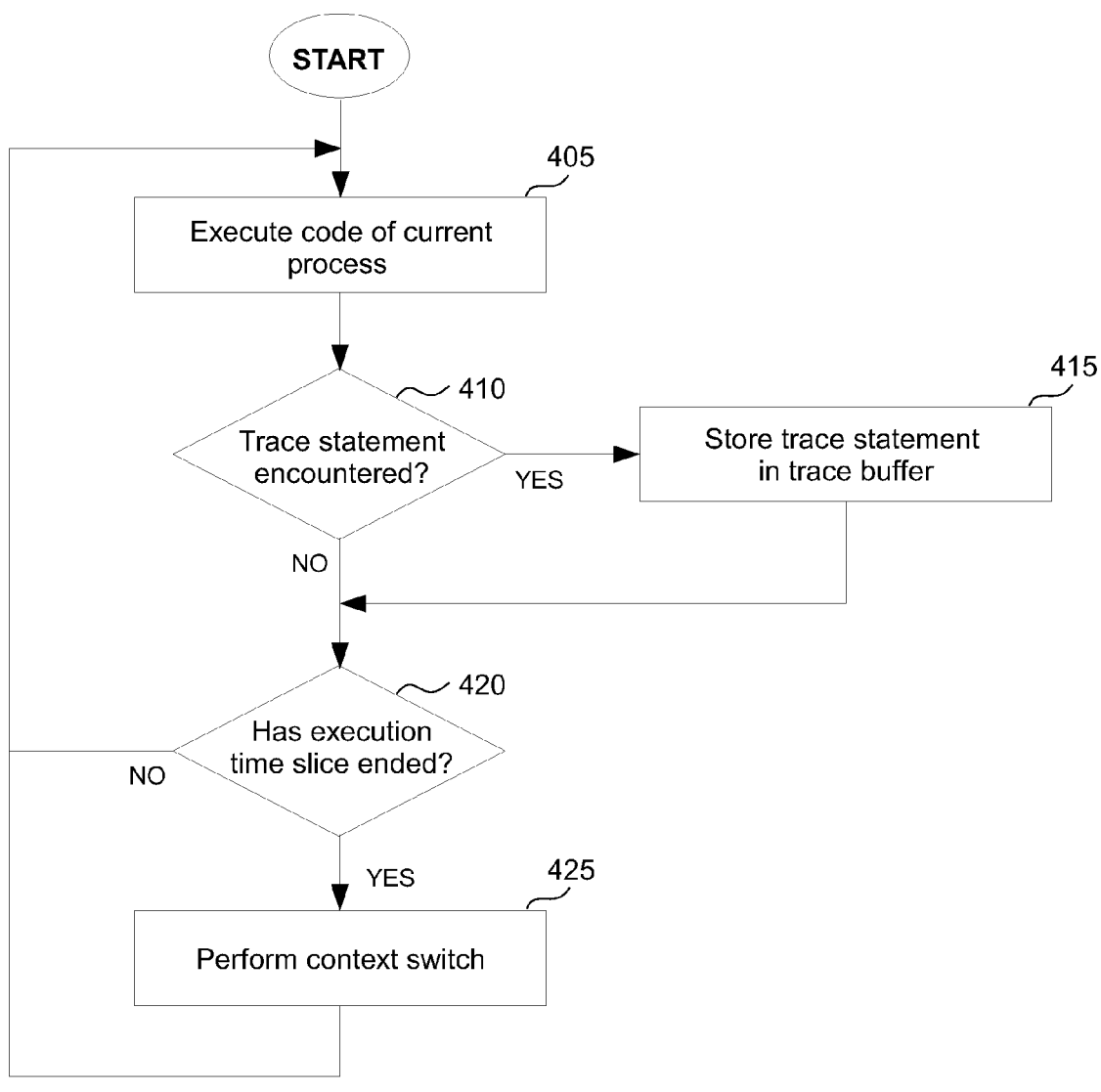
FIG. 4 illustrates a method of performing a runtime code trace in a distributed network fabric, according to one embodiment.

FIG. 4 illustrates a method 400 of performing a runtime code trace at a controller node (e.g., controller node 110) of a distributed network fabric. According to an embodiment, the method 400 provides a more detailed description of step 305 of the method 300. The method begins at step 405, where a processor (e.g., CPU 240) of the controller node may execute code of a current process. The code may be executed for the duration of an execution time slice for such process. At step 410, the processor may determine whether a trace statement has been encountered in the current process code. If at step 410 the processor has not encountered a trace statement, then the method may proceed directly to step 420, further described below. Otherwise, responsive to encountering a trace statement, at step 415, the processor may store a trace statement in a trace buffer among a plurality of trace buffers of the controller node (e.g., trace buffers 215). According to an embodiment, the processor may store the trace statement in a trace buffer corresponding to a firmware component referenced by the trace statement.

According to an embodiment, the trace buffers may be memory-mapped circular buffers, and the process currently executing at the controller node (and all other processes) may have memory-mapped access to the buffers. Moreover, each trace buffer may correspond to a firmware component of the controller node. Thus, program code may be traced via one or more specific trace buffers corresponding to one or more respective firmware components of the controller node. Since past results may be indicate which traces would be helpful to identify the circumstances of a specific error, one or more trace buffers may be designated to store trace information for such error.

At step 420, the processor of the controller node may determine whether the execution time slice for the current process has ended. At step 420, the processor determines whether that the execution time slice for the currently executed process has ended. Responsive to determining that the execution time slice for the current process has not ended, the method may return to step 405. Otherwise, responsive to determining that the execution time slice for the current process has ended, at step 425, the processor of the controller node may facilitate a context switch in order to execute code of a new process. Subsequently, the method may return to step 405, where the processor may execute code of the new process and subsequently may process any trace statements encountered in the new process code. According to the method 400, trace statements with respect to a series of executed processes may be placed in appropriate trace buffers in the order in which the trace statements are encountered by the processor.

The method 400 may efficiently determine the precise order in which a processor executes processes and also the precise order in which the processor encounters trace statements pertaining to the executed processes. Since each process executing on the processor may have memory-mapped access to trace buffers, each process may identify relevant trace information and may facilitate buffering of such information relatively quickly. Accordingly, trace information relevant to an error occurring at a controller node of the distributed network fabric may be accessed without accessing a relatively large system trace log.

Figure 5:
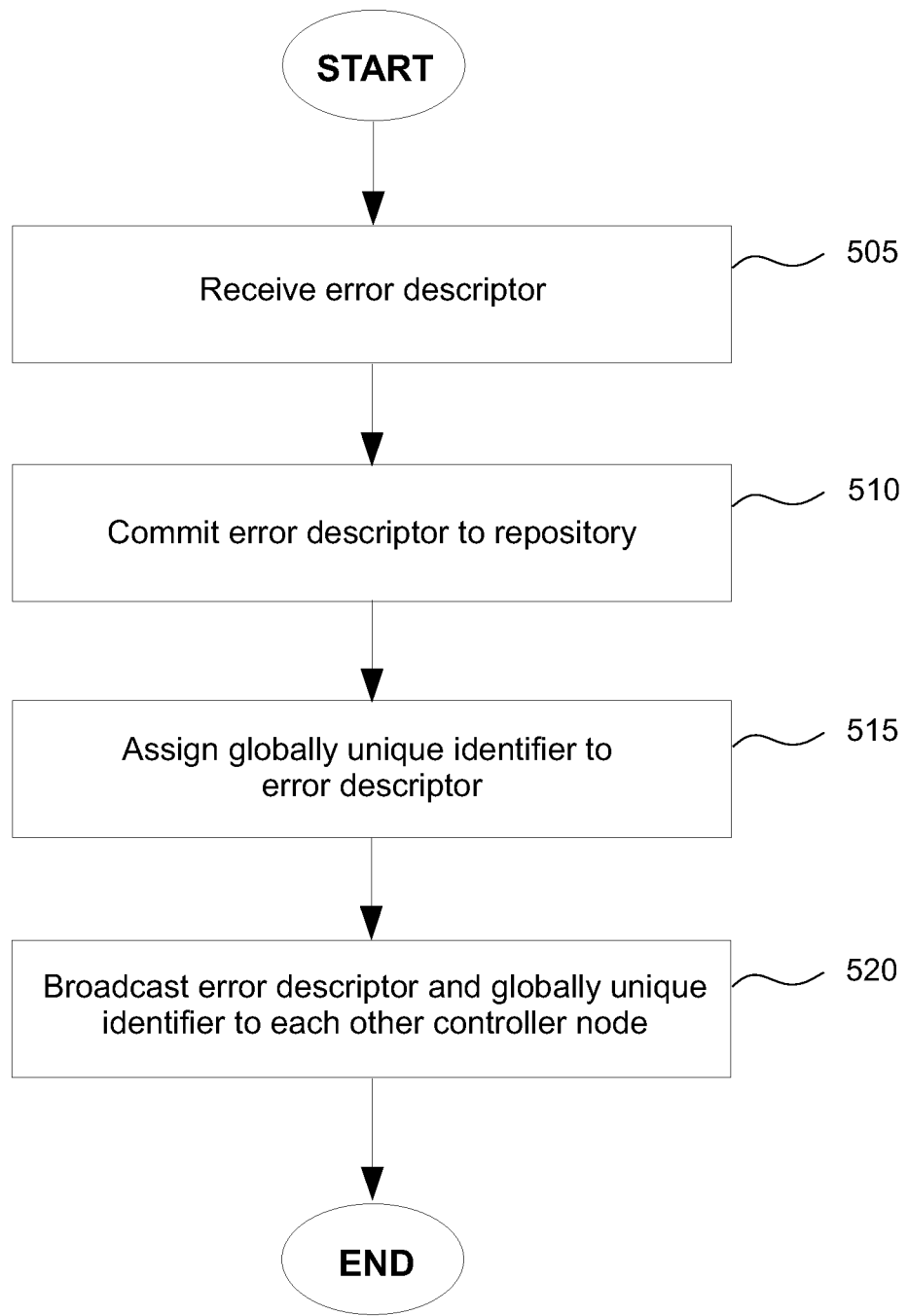
FIG. 5 illustrates a method of managing an error descriptor in a distributed network fabric, according to one embodiment.

FIG. 5 illustrates a method 500 of managing an error descriptor in a distributed network fabric. The method begins at step 505, where a first controller node of the fabric (e.g., controller node 120) may receive an error descriptor from a second controller node of the fabric (e.g., controller node 110). The second controller node may receive the error descriptor via a fabric mesh (e.g., fabric mesh 150). According to an embodiment, the first controller node may be a master controller node. Such a master controller node may coordinate activities among the controller nodes of the fabric. The second controller node may be a controller node at which the error descriptor and its corresponding error log are created, as previously described in the context of the method 300.

At step 510, the first controller node may commit the error descriptor to a database of the first controller node. In some embodiments, the first controller node may store the error descriptor in a database of the first controller node. At step 515, the first controller node may assign the error descriptor an identifier that is globally unique in the fabric. Such identifier may be associated with both the error descriptor and the error log from which the error descriptor is created. Such identifier also may be stored in a database of the first controller node. At step 520 the first controller node may broadcast the globally unique identifier, along with the error descriptor itself, to each of the other controller nodes in the fabric. As a result of the broadcast, each controller node may have a copy of the error descriptor.

If a controller node on which an error occurs remains functional following the error, the master controller node may obtain a copy of a full error log (or significant portions thereof) from the affected controller node when needed for debugging purposes. That is, a controller node may retrieve an error log copy only when necessary, thus saving storage and network bandwidth.

Figure 6:
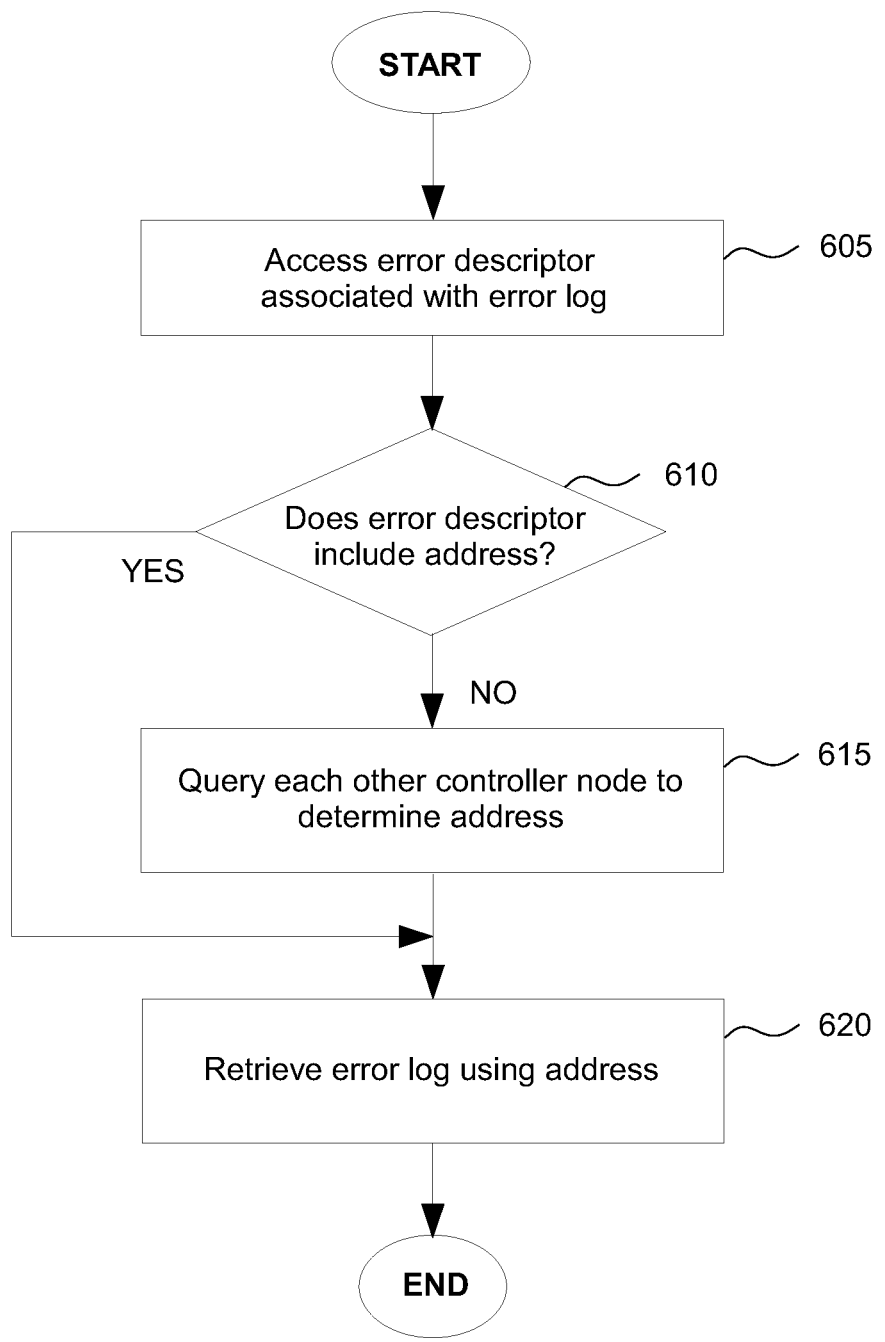
FIG. 6 illustrates a method of retrieving a copy of an error log, according to one embodiment.

FIG. 6 illustrates a method 600 of retrieving a copy of an error log in a distributed network fabric. The method 600 begins at step 605, where a first controller node (e.g., controller node 120) may access an error descriptor associated with the error log of a second controller node (e.g., controller node 130). According to an embodiment, the first controller node may be a master controller node. At step 610, the first controller node may determine whether the accessed error descriptor includes an address of the second controller node. Responsive to determining that the accessed error descriptor includes an address of the second controller node, the method may proceed to step 620. Otherwise, responsive to determining that the accessed error descriptor does not include an address of the second controller node, at step 615 the first controller node may query each of the other controller nodes in the distributed network fabric to determine the address of the second controller node. At step 620, using the address of the second controller node, the first controller node may retrieve the error log from the second controller node.

Accordingly, upon occurrence of an error, a given controller node may retrieve "on demand" a copy of the error log from the controller node at which the error occurred. According to another embodiment, upon occurrence of an error, an error log may be obtained automatically by a given controller node (e.g., via an application programming interface (API) script).

It is appreciated that in some embodiments, an error descriptor may be significantly smaller than an error log. For example, while an error log may be several megabytes in size, an error descriptor may be several hundred bytes in size. Accordingly, broadcasting an error descriptor of an error log to each controller node in a distributed network fabric rather than the error log itself may save significant network bandwidth and storage space among the controller nodes of a distributed network fabric.

Moreover, while an error descriptor may not include all of the information present in a corresponding error log, an error descriptor may include sufficient information to determine the nature of an error in the event that an error log is lost. For example, in a scenario in which a master controller node catastrophically fails, each controller node in the network fabric would have sufficient knowledge of the error based on the broadcasted error descriptor to be able to retrieve the code location of the error. Moreover, even though a full error log of a controller node may not be accessible in a scenario in which such controller node crashes, the corresponding error descriptor provided to the master controller node and broadcasted to the other controller nodes would include information sufficient to determine the controller node on which the error occurred and the code location of the error.

According to the various embodiments described herein, error logs and corresponding error descriptors may be efficiently created and managed in a distributed network fabric. Moreover, runtime code trace information may be incorporated into an error log without accessing a relatively large system trace log. The embodiments provide an efficient and inexpensive solution for identifying and addressing errors in a fabric while saving bandwidth and storage.

While the foregoing is directed to various embodiments, other and further embodiments may be devised without departing from the basic scope thereof, and the scope thereof is determined by the claims that follow.

What is claimed is:

1. A computer-implemented method of managing errors in a distributed network fabric comprised of a plurality of controller nodes, the method comprising:
    receiving, at a first controller node, an error descriptor from a second controller node among the plurality of controller nodes, wherein the error descriptor is created at the second controller node based on an error log;
    committing the error descriptor to a database;
    assigning an identifier to the error descriptor, the identifier being globally unique in the distributed network fabric; and
    broadcasting the error descriptor and the identifier to each other controller node among the plurality of controller nodes.

2. The computer-implemented method of claim 1, wherein the first controller node is a master controller node that coordinates activities among the plurality of controller nodes.

3. The computer-implemented method of claim 1, wherein the error log includes output obtained by performing a runtime code trace.

4. The computer-implemented method of claim 3, wherein performing the runtime code trace comprises storing one or more trace statements from a currently running process in one or more of a plurality of trace buffers, and wherein each of the plurality of trace buffers corresponds to a respective firmware component of the second controller node.

5. The computer-implemented method of claim 4, wherein the plurality of trace buffers are memory-mapped circular buffers.

6. The computer-implemented method of claim 1, wherein the error log includes metrics indicating at least one of: a listing of firmware components affected by or contributing to the error, an identifier of a process in which the error occurred, a code location at which the error occurred, a host name of the controller node at which the error occurred, a network address of the controller node at which the error occurred, a count of previous occurrences of the error, a timestamp for when the error occurred, and one or more error return codes.

7. The computer-implemented method of claim 6, wherein the error descriptor includes a subset of the metrics included in the error log.

* * * * *